Jan. 27, 1925.
T. C. NIXON
1,524,051
FOOD PRODUCT AND PROCESS OF MANUFACTURE
Filed Dec. 10, 1919 4 Sheets-Sheet 1
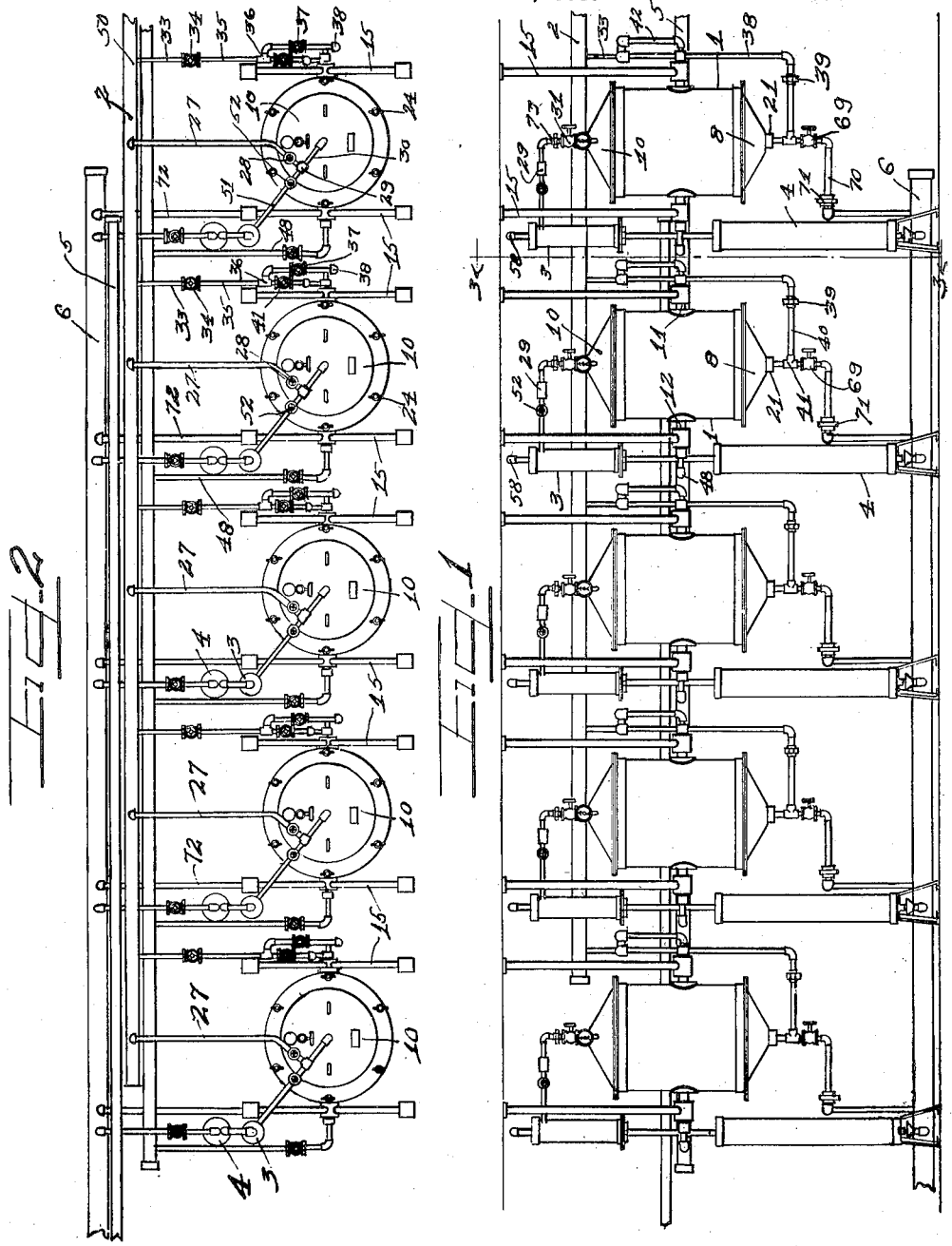

Jan. 27, 1925. 1,524,051
T. C. NIXON
FOOD PRODUCT AND PROCESS OF MANUFACTURE
Filed Dec. 10, 1919 4 Sheets-Sheet 2
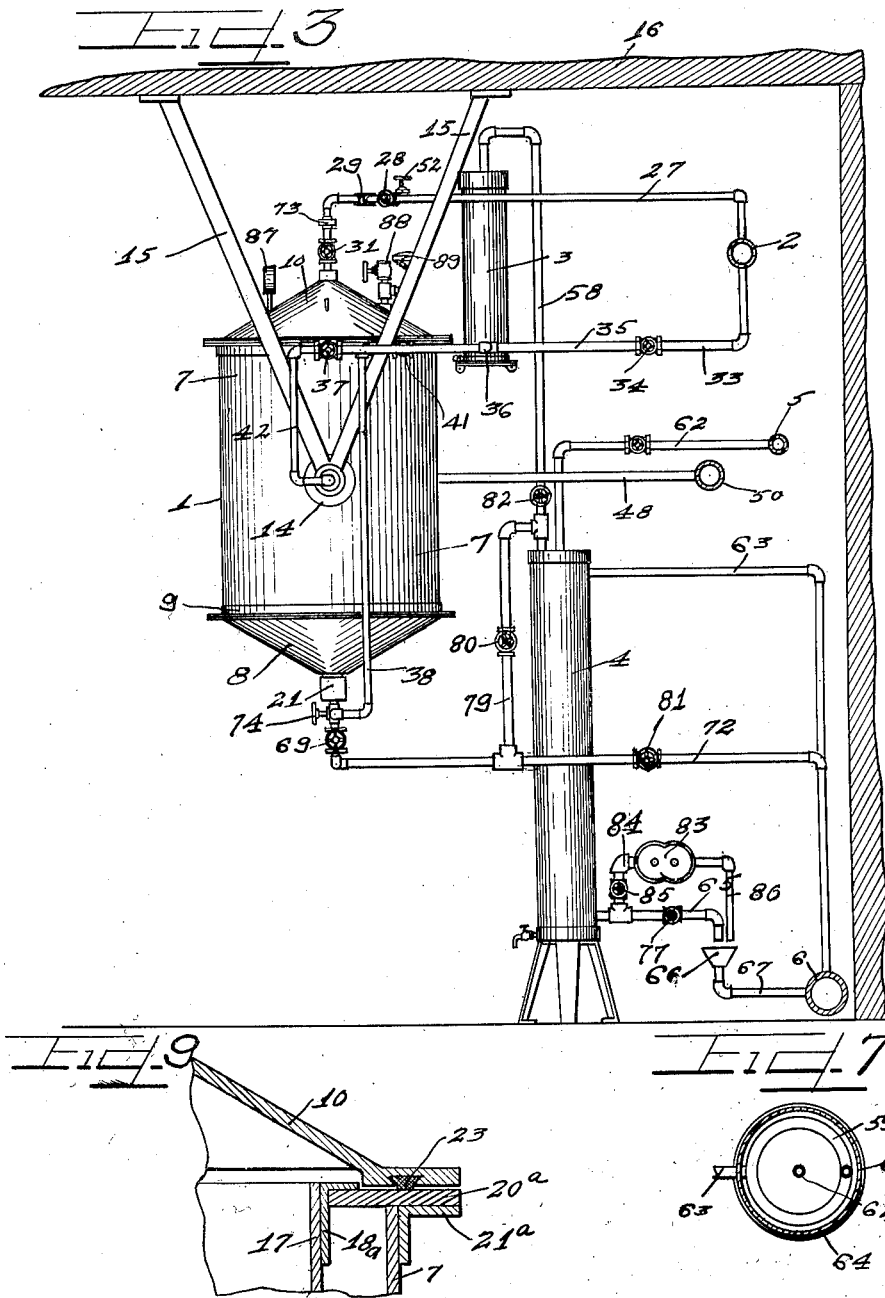
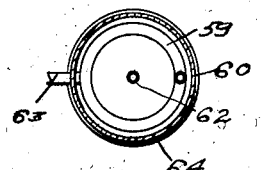
Witnesses
Inventor
Thomas C. Nixon.

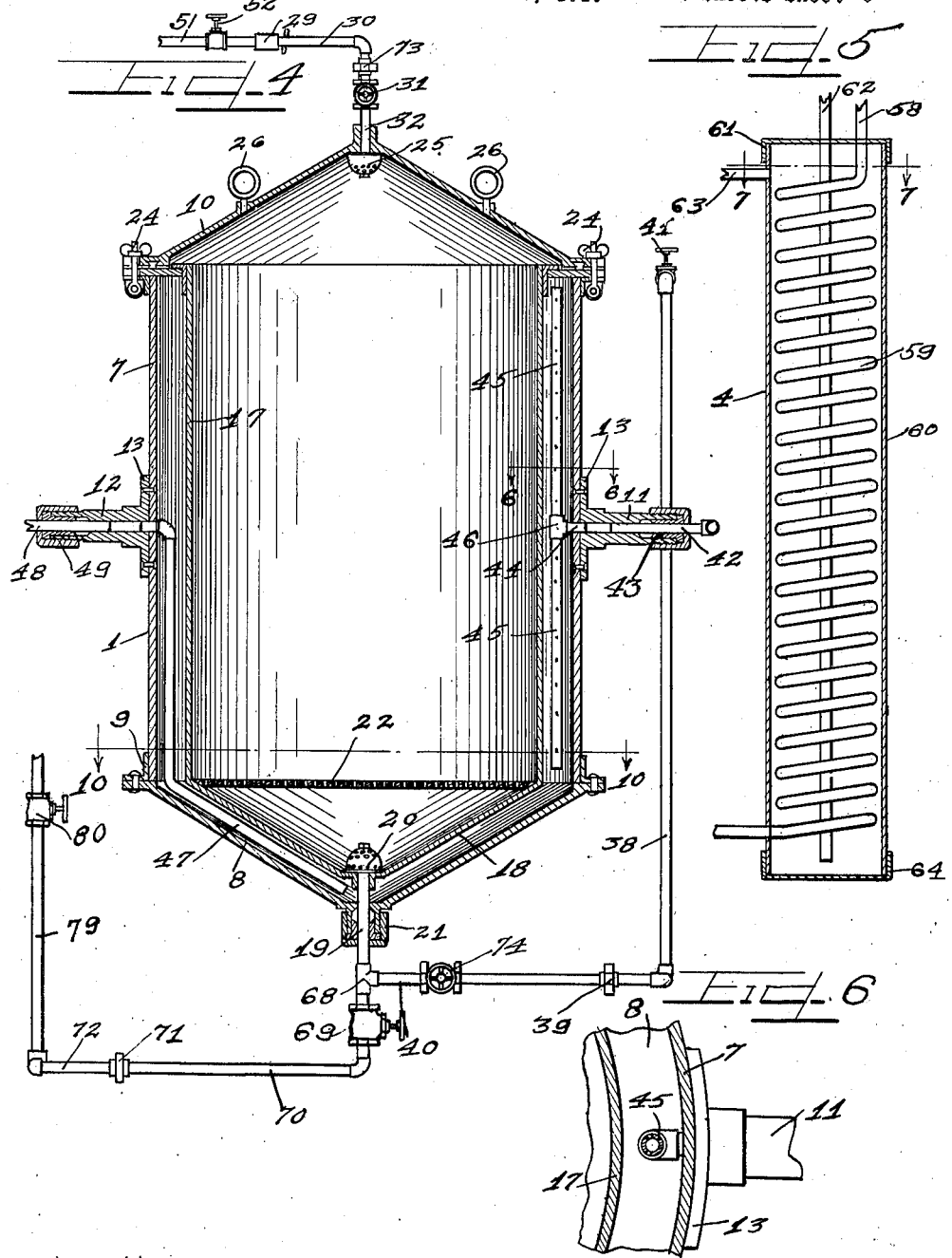

Jan. 27, 1925.                                                    1,524,051
T. C. NIXON
FOOD PRODUCT AND PROCESS OF MANUFACTURE
Filed Dec. 10, 1919    4 Sheets-Sheet 4
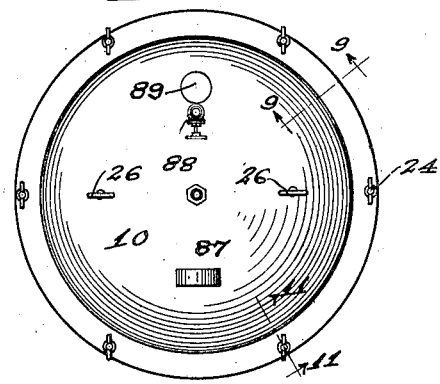
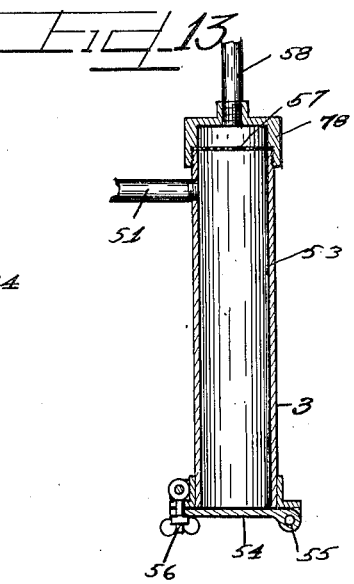
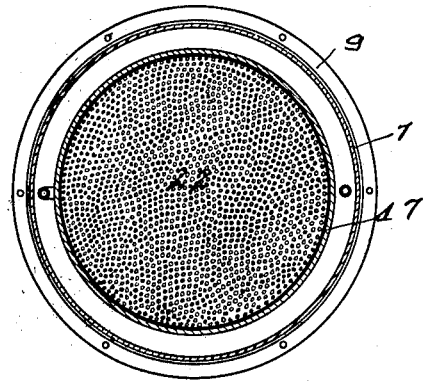
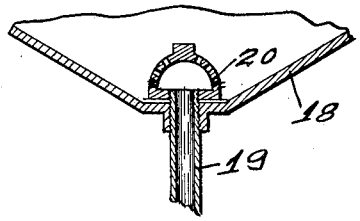
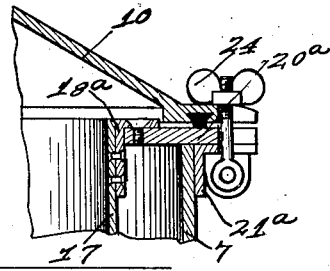
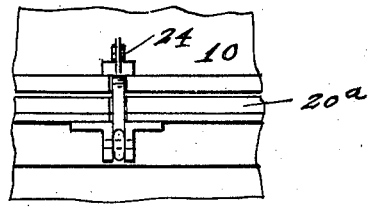
Witnesses
Rudolph T. Berg.
Inventor
THOMAS C. NIXON Patented Jan. 27, 1925.

1,524,051

UNITED STATES PATENT OFFICE.

THOMAS C. NIXON, OF CHICAGO, ILLINOIS.

FOOD PRODUCT AND PROCESS OF MANUFACTURE.

Application filed December 10, 1919. Serial No. 343,754.

*To all whom it may concern:*

Be it known that I, THOMAS C. NIXON, a citizen of the United States, and a resident of the city of Chicago, in the county of Cook and State of Illinois, have invented certain new and useful Improvements in a Food Product and Process of Manufacture; and I do hereby declare that the following is a full, clear, and exact description of the same, reference being had to the accompanying drawings, and to the numerals of reference marked thereon, which form a part of this specification.

This invention relates to a food product and process for manufacture and although not restricted to such use, is particularly adapted for the treatment of cereals, to convert them into ready to eat foods.

Cereals such as oats, treated in a double cooker, are more solid and heavy than is desirable and further contain small amounts of certain ingredients having disagreeable taste and smell.

It is an object, therefore, of the present invention to provide an improved process for treating cereals and other food products.

An important object is to provide means for eliminating certain disagreeable and rancidity-producing ingredients from raw food products.

Another object of the invention is to provide an improved process for treating cereals to make them lighter and less solid in texture.

Still another object of the invention is the provision of a process for treating cereals and the like which removes from the grain, without altering the form of same, the decomposed fats and proteins together with those elements which originate the phenomena of life.

A further object of the invention is to provide means whereby food products may be successively subjected to the action of water and then steam under pressure.

Other and further important objects will be apparent from the disclosures in the drawings and specification.

If cereals such as oats are subjected to the action of a current of heated gas, certain undesirable constituents are carried away by such current. This effect is also increased if, simultaneously with the passage of such current of heated gas, steam is generated in the interior of the grains so that it inflates the latter gradually escaping through the skin of the grains carrying the vapor of such undesirable constituents from the interior of the grain into the current of heated gas flowing around the grains. With such a process not only are deleterious substances removed but also the grains are puffed and rendered much lighter in texture and less dense.

While cereals normally contain considerable water which under suitable conditions may be converted into steam to puff the grains much better results are obtained by saturating the grains with water preferably by immersing them in boiling water and then raising the pressure above atmospheric to force the water into the grains.

The steam carries with it certain rancidity producing elements whose exact nature is not at present known although they have very obnoxious taste and odor. The oil in the cereal is not itself the factor which produces rancidity since in tests made on oats having an oil content of about 6%, only one-tenth of one per cent (0.1%) or less of the oil was removed in rendering the oats sweet and free from such rancidity-producing elements. Apparently, however, these deleterious substances are present largely in or are associated with the natural oils of the cereals to be found more particularly in the germ of the cereal and to a lesser extent in the skin or bran coats of the oats. My product, therefore, has the advantage over such products as hominy grits, corn flakes and other kindred foods, for the reason that it contains the greater part of the vital oils of the cereal while at the same time the objectionable constituents of the oil and other parts are eliminated.

Another feature of the process is the production of a gelatinized layer around each grain resulting in much less loss, if any, of the very valuable constituents occupying the outer surface of the material receiving treatment. As a result of the sudden immersion of the material into boiling water, the formation of this gelatinized layer takes place before appreciable loss of such constituents can occur. The forcing of hot water under any desired pressure into these substances followed by treatment with steam, preferably at a higher pressure, results in the removal of effete and rancidity-producing elements such as fats, decomposed proteins, and the like, and doubtless other constituents which produce what is known as lousy grain, or that inhabited by weevils, worms or insects. The grain when so treated is freed from those qualities or elements which produce animal life.

Spoiled cereals may also be treated by this process resulting in a product which is pure, sweet and wholesome.

Treatment of the above food stuffs with a current of live steam under pressure is also advantageous in that the materials are cooked without the removal, to any great extent, of the salts or other soluble constituents. In carrying out the improved process various forms of apparatus may be used, such as that shown by way of example in the accompanying drawings.

On the drawings—

Figure 1 is a front elevation of a battery of treaters embodying the features of the present invention.

Figure 2 is a plan view of the same.

Figure 3 is a section on the line 3—3 of Figure 1.

Figure 4 is a vertical, central section through one of the treaters.

Figure 5 is a vertical central section through the condenser.

Figure 6 is a section on the line 6—6 of Figure 4.

Figure 7 is a section on the line 7—7 of Figure 5.

Figure 8 is a top plan view of one of the treaters.

Figure 9 is a section on the line 9—9 of Figure 8.

Figure 10 is a section on the line 10—10 of Figure 4.

Figure 11 is a section on the line 11—11 of Figure 8.

Figure 12 is a side view of the parts shown in section in Figure 11.

Figure 13 is a section through the steam trap.

Figure 14 is a section through one of the steam nozzles of the treater.

As shown on the drawings—

In Figures 1 and 2 a battery of treaters is shown. As the construction of each treater is the same, a description of one unit will suffice. Each unit comprises a treater generally designated as 1 provided with means whereby steam may be passed therethrough from a main steam pipe 2, from either the top or the bottom of the treater. Means are also provided for heating the vessel by means of steam from the same source. The steam issuing from the treater is passed through a steam trap 3 as shown in Figure 3 to collect any particles of grain, chaff, or the like which may be carried over mechanically by the steam. The steam then enters a condenser 4 cooled by any suitable means such as water from the water pipe 5. The condensate from the condenser 4 is then passed to a drain pipe 6 or if desired collected for the sake of the oil and other materials which it contains.

The treater itself as shown in Figure 4 comprises an outer shell 7 to the bottom of which is secured a conical bottom 8 by means of an annular ring 9 of angular cross-section. The upper end of the vessel is closed by means of a detachable cover or lid 10. The vessel is supported by trunnions 11 and 12 secured to the outer shell 7 by means of flanges 13. These trunnions are arranged to turn in bearings 14 attached to the lower ends of brackets 15 secured to the ceiling 16 as shown more particularly in Figure 3. This arrangement enables the vessel to be swung about a transverse axis in order to discharge its contents.

Within the outer shell 7 of the treater is arranged an inner shell 17 which is connected to the outer shell by means of a ring 18$^a$ of angular cross-section connected by screws to an annular plate 20$^a$. This plate 20$^a$ is in turn secured to the outer shell 7 by means of an angle ring 21$^a$. By this means a steam-tight closure is obtained between the outer shell 7 and the inner shell 17. The lower end of the inner shell 17 is provided with a conical bottom 18 formed integrally therewith through which projects a pipe 19 provided at its upper end with a steam nozzle 20. This pipe 19 is arranged to pass through a gland 21, attached to the lower end of the bottom 8 so as to provide a sliding steam-tight joint between the pipe 19 and the outer portion of the treater. This sliding connection allows for unequal expansion and contraction between the inner and outer shells of the treater. A perforated plate 22 is arranged to rest upon the corners of the bottom 18 for the purpose of supporting the cereal, or other material to be treated. The lid 10 is furnished with a gasket ring 23 preferably of lead, dovetailed into the under surface of the periphery of the lid so as to make a steam-tight connection between the lid and the annular plate 20 when the lid is clamped down by means of thumb screws 24 of usual construction. At the upper end of the lid is arranged a second steam nozzle 25 so that steam may be passed downwardly through the treater instead of upwardly if desired. Ring bolts 26 are provided to aid in the lifting of the lid off the treater. For supplying steam to the nozzle 25 from the steam pipe 2, suitable piping connections are provided. These include a pipe 27, leading to a valve 28, T-union 29, pipe 30, valve 31, and pipe 32 on the lower end of which is secured the steam nozzle 25. Steam is supplied from the main steam pipe 2 to the nozzle 20 in the lower end of the treater, by means of pipe 33, valve 34, pipe 35, T-union 36, valve 41, pipe 38, union 39, valve 74, pipe 40, T-union 68 to one arm of which the pipe 19 is connected. Means are also provided for introducing steam from the same source into the space between the inner and outer shells of the vessel in order to heat the contents of the former. For this purpose one arm of the T-union 36 is connected through a valve 37 to a pipe 42 the end of which extends into the bore of the trunnion 11. Gland 43 provides for a fluid-tight packing between the trunnion 11 and the pipe 42. Projecting into the opposite ends of the trunnion and secured thereto is a short pipe 44 connected to a pair of perforated vertical pipes 45, by means of T-union 46. By this means steam is admitted into the space between the inner and outer shells, throughout substantially the entire height thereof. Steam or condense water is exhausted from this space by means of a pipe 47, terminating adjacent to the lower end of the bottom 8 so as to be able to carry off any water which may accumulate in the jacket. The upper end of this pipe 47 is secured to the trunnion 12. Axially arranged in the same trunnion is a pipe 48 about which the trunnion is arranged to turn when desired, a gland 49 being provided to insure fluid-tight contact between the pipe 48 and the trunnion 12. The pipe 48 is connected to a main 50 for returning the exhaust steam and condense water from the jacket to the boiler.

When steam is passed upwardly through the vessel, it is carried away to a steam trap 3 by means of a pipe 51 connected to one arm of the T-union 29. At this time the valve 28 connected to the pipe 27 is closed. A valve 52 is arranged in this pipe so that the flow of steam through this pipe may be prevented when steam is admitted to the vessel from its upper end through the pipe 27.

The construction of the steam trap is shown more particularly in Figure 13. It consists of a shell 53 to the lower end of which a bottom plate 54 is hinged at 55. A thumb screw 56 is provided for clamping this bottom plate against the lower end of the casing. A perforated diaphragm 57 is placed on top of the casing and held in position there by means of a cap 78 having threaded engagement with the exterior of the casing. This diaphragm holds back any solid particles carried over by the steam mechanically which fall to the bottom and may be removed from time to time as desired. The steam passing through the diaphragm 57 enters the pipe 58 and is carried thereby into the condenser 4 the construction of which is shown more particularly in Figure 5. The pipe 58 after entering the condenser is either formed into or attached to a coil 59 arranged within a vertical casing 60 provided with top and bottom closing members 61 and 64. Cooling water is admitted into the casing by means of a pipe 62 from a water main 5. This pipe 62 terminates at a point adjacent the lower end of the casing so that the water passes upwardly through the condenser with the result that the coolest water comes in contact with the condenser coil at a point where the condensation is substantially complete, and the warmest water comes in contact with the steam as it enters. Water leaves the condenser through a pipe 63 and passes thereby into the drain pipe 6. The condensate from the coil 59 passes through a valve 77 into a pipe 65 which may discharge either into a collecting chamber or into a funnel 66 connected by a pipe 67 to the drain pipe 6. When steam is blown from the top of the apparatus downwardly, the exhaust steam is passed through a nozzle 20, pipe 21, T-union 68, valve 69, pipe 70, union 71, and pipe 72 to the drain pipe 6.

Instead of passing steam directly from the lower end of the vessel 1 into the drain pipe 6 it may be passed through the condenser 4. For this purpose a pipe 79 is provided connecting the pipes 72 and 58 while valves 80, 81, and 82 are arranged in these respective pipes for controlling the flow of fluid therethrough as desired.

In order that a vacuum may, if desired, be produced in the vessel 1, a suction pump 83 may be connected by pipes and union 84 and valve 85 to the pipe 65 between the valve 77 and the condenser 4. This discharge pipe 86 of this pump is arranged to discharge into the funnel 66.

The function of the unions 73, 39, and 71 is to allow the various pipe connections with the top and bottom of the vessel to be broken when it is desired to swing the vessel about its trunnions for the purpose of discharging its contents. A pressure gauge 87 is mounted on the lid 10. A blow-off valve 88 and a safety valve 89 are also provided. The blow-off valve enables the pressure within the vessel 1 to be reduced to atmospheric when it is desired to drain the water off from the cereals and also when it is desired to remove the lid after treatment with steam under pressure.

The operation is as follows:

As illustrating the use of the apparatus for the treatment of groats the following procedure is given. First, twenty-one quarts of clean water are placed in the treater with the steam turned on in the jacket. After the water has come to a boil it is allowed to boil hard for several seconds and then eighteen quarts of clean oat groats are stirred into the water. The sudden treatment of the oats with boiling water produces a gelatinous layer around each grain which inhibits the loss of the very valuable constituents of the oats. When all of the oat groats have been introduced into the treater, the lid is clamped down tight and a gauge pressure of about six pounds is maintained by the heat of the steam in the jacket around the treater.

This treatment with hot water and steam pressure combined is allowed to continue until the groats have become completely saturated with the boiling water which is forced into them as a result of the pressure in the vessel. This part of the process usually is complete in a few minutes although the time required depends upon the nature of the groats, some requiring longer treatment than others. The exact time of treatment may readily be determined by actual experiment. After saturation of the groats with hot water the latter is drawn off through the pipes 19, 70, and 72. Then the valve 69 is closed and the valve 74 is opened to admit live steam through the nozzle 20 into the lower part of the treater. This steam is preferably introduced at a pressure of between 40 and 50 pounds to the square inch, and percolates through the grain in the treater and finally escapes through the nozzle 25, pipe 32, and other connections to the steam separator. In this part of the process the valve 52 is adjusted so that the pressure in the upper part of the treater is in the neighborhood of six or eight pounds to the square inch, the greater part of the drop in pressure occurring as a result of the passage of steam through the materials in the treater.

This current of steam raises the temperature of the water-soaked grain with the result that steam is produced within the grains, causing them to swell and increase in size. At the same time the undesirable constituents of the grain, particularly those associated with the oil in the grains are carried away by the current of steam so that the final product is much sweeter to the taste and smell than the original grain and is given vastly improved keeping qualities as well as having been rendered less heavy and dense by the expanding action of the steam within the grains. After this current of steam has been passed through the apparatus for several minutes, the valves 74 and 37 are closed, unions 39, 71, and 73 are detached, and the vessel as a whole swung on its trunnions to discharge its contents.

The steam pressure further keeps the grains in their original shape by holding them in such close contact that they support each other while in the treater. Puffing of the grains results from the steam treatment, but the original form of each grain remains the same.

After removal from the treatment the oat groats may be passed through a breaker to reduce all lumps or clots and are then transferred to a suitable dryer where all the remaining moisture is removed. When dry the groats are passed through any suitable granulating device where they are reduced to suitable granules which are then spread upon a moving metallic conveyor belt. This belt is arranged to pass over a clean hot fire so that each granule is toasted to a rich golden brown color. The granules when cold are then ready for use. The oat groats treated by this process may be made up into a shredded oat biscuit similar to the shredded wheat biscuit now on the market but which is composed entirely of oats and this product may also be made up into oat wafers or oat biscuits, puffed, flaked, rolled or shredded oats or shredded oat crackers and many other forms which might be suggested.

It must be understood that no hard and fast rule of treatment for materials in any way can be followed. For instance no two varieties of oats will react exactly alike under the same treatment. Northern varieties of oats will require slightly different treatment from southern species. It is quite obvious that hard, strong, and hearty oat groats during treatment will endure a greater degree of moisture before saturation and will withstand a higher steam pressure without breaking down than will the softer varieties. All varieties can, however, be successfully treated with my process and apparatus in the same general way with only slight variations in the heat, moisture, time, etc. The manipulation of the apparatus to suit individual requirements may be very readily made by anyone skilled in the art.

Although the invention has been described more particularly in connection with cereals it is also applicable to the removal of rancidity-producing substance from oil-bearing seeds and food stuffs of all kinds.

I am also aware that numerous details of construction and operation may be varied through a wide range without departing from the principles of this invention, and I therefore do not purpose limiting the patent granted otherwise than necessitated by the prior art.

I claim as my invention—

1. A process for preparing food products comprising puffing cereals by internal steam pressure and also subjecting the cereals to the action of a current of steam to remove materials of obnoxious taste and odor.

2. A process of preparing food products comprising treating cereals with boiling water under pressure to force water into the grains, withdrawing the water and then subjecting the grains to increased temperature to generate steam within the same and so puff up the grains.

3. A process of preparing food products including subjecting cereals to the action of a current of steam under pressure to remove materials of obnoxious taste and odor.

4. A process of preparing food products comprising treating cereals with water under pressure to force water into the grains, withdrawing the water and subjecting the grains to a temperature sufficient to generate steam within the grains to increase their size.

5. Process for treating cereals including introducing the grains of cereal into boiling water, draining off the water and then passing a current of steam through the mass of cereals.

6. As an article of commerce whole grain cereal with the rancidity producing elements substantially removed.

7. An article of commerce comprising a prepared food product consisting of oat groats with the rancidity-producing elements substantially eliminated.

8. The process of preparing a food product from oat groats which consists of treating the groats with boiling water under pressure of force water into said groats, withdrawing the water, and then subjecting the groats to a current of steam under pressure.

In testimony whereof I have hereunto subscribed my name in the presence of two subscribing witnesses.

THOMAS C. NIXON.

Witnesses:
 LAWRENCE REIBSTEIN,
 CARLTON HILL.